UNITED STATES PATENT OFFICE.

WILLIAM L. AUSTIN, OF SAN FRANCISCO, CALIFORNIA.

PROCESS OF SMELTING ORES.

SPECIFICATION forming part of Letters Patent No. 513,974, dated February 6, 1894.

Application filed February 28, 1893. Serial No. 464,096. (No specimens.)

*To all whom it may concern:*

Be it known that I, WILLIAM L. AUSTIN, a citizen of the United States, and a resident of San Francisco, in the county of San Francisco, and in the State of California, have invented certain new and useful Improvements in Processes of Smelting Ores of the Useful Metals; and I do hereby declare that the following is a full, clear, and exact description thereof.

The object of my invention has been to provide an improved process of smelting ores of the useful metals, using the natural or artificial metallic sulphides, arsenides, or antimonides, or compounds of the same, as the heat producing elements of the furnace charge, and to this end my invention consists in the process as hereinafter specified.

In carrying out my process, I can use any desired form of furnace with an upright shaft, preferably, having a closed top provided with means for allowing the different parts of the charge to be fed into and down within the shaft, in the manner to be described hereinafter, and a suitable out-take for the gases and products of combustion, situated near its upper end.

The lower part of the furnace is to be provided with suitable tuyeres connected with a source of supply of hot air, under pressure, to form a strong hot-air blast, and with means whereby the molten products coming from the zone of fusion can be drawn away, as formed, out of the path of the blast.

In carrying out my process, after the furnace has been heated up in the usual way by coke, coal, or other carbonaceous fuel, I feed in the sulphides, arsenides, or antimonides, or other easily fusible ores, so that they occupy the center of the furnace shaft, in a column well out of contact with the furnace walls. In, around such column, so as to fill the space between it and said walls, I feed silicious ores, slag, lime rock, or other substances, less fusible than those of the central column. The feeding of the sulphides or other ores, for the central column, and the materials to form the layer surrounding such column, can, with a furnace provided simply with suitable charging openings at its upper end, be kept up continuously during the action of the furnace. As more of the sulphides, or other ores are fed in centrally, the silicious ores, slag, lime rock, or other substances less fusible than those of the central column, are also fed into the furnace, so as to surround the new addition to said column, and separate it from and keep it out of contact with the furnace walls. By this arrangement of the different constituent parts of the charge, maintained by proper feeding throughout the continued operation of the furnace, I make sure that the sulphides or other easily fusible materials shall not, at any time, come into contact with the walls of the furnace above the zone of fusion, where they might stick, because of their partial fusion by the heat to which they are subjected. I, also, because of the less fusible nature of the constituent parts of the layer surrounding the central column of sulphides, arsenides or antimonides, am enabled to keep a passage open, through which the hot blast may pass upward within the furnace, and effectually prevent the clogging up of the shaft, which would be caused by the softening and agglomeration of the sulphides and other more fusible materials, if they were fed into the furnace shaft, so as to extend entirely across within the same. With no carbonaceous fuel mixed with the charge, and the sulphide ores fed into the upper part of the furnace shaft, so as to extend across within the same, I have found that such ores, even when not melted, or agglomerated together under the softening influence of heat, tend to pack together and form a dense mass, capable of resisting the upward passage of air and gases from the tuyeres and zone of fusion, so that the action of the furnace will be stopped. This, as indicated hereinbefore, I avoid by the peculiar way in which I feed the different constituent parts of the charge down in the furnace, for I make sure that there will always be a sufficiently easy and free passage for the air and gases up around the column of sulphides, arsenides, antimonides, or other fusible ores.

In operating my process and using sulphide of iron, I have found that a charge consisting of from forty-five per cent. to sixty per cent. of the sulphide, and from fifty-five per cent. to forty per cent. of quartzose ores and lime-stone mixed with a little slag, gives excellent result, when fed down in the manner described. The ingredients of this charge are so proportioned, that the resultant slag may have the lightest specific gravity which it is possible to obtain at commercially profitable rates, combined with easy fusibility, and freedom from appreciable amounts of the metals sought after. With the charge arranged and fed down in the heated furnace, in the manner described, the hot blast applied, and the molten products drawn off, as formed, out of the way of the blast, as set forth hereinbefore, the materials in the outer layer of quartzose (silicious) ores, slag, lime-stone, being more infusible than the sulphides, antimonides or arsenides of the central column, do not tend to stick to the walls of the furnace, or pack together, but retaining their granular nature, feed easily downward to the zone of fusion, and maintain a passage for the upward flow of the gases and products of combustion from such zone. They also act to stop the fine dust, and volatilized materials, and hinder the same from being blown out through the out-take in the upper part of the furnace. The flames and gases are applied directly to the lower part of the central column of fusible ores, but do not have to pass up through any considerable extent of such column. The result is a continuous smelting action, without any danger of clogging or stopping up of the furnace, so as to interfere with the continuous downward feeding of the charge, or check the required upward passage of the blast, flames and gases, and a retaining within the furnace, of the volatilized metals, which, in the ordinary smelting operations, are apt to be carried up and out through the out-take.

I do not claim or desire to cover by my claims a process in the carrying out of which a column of ore, in a furnace, is in part or in whole, surrounded by a layer composed entirely of coke or coal, or the different constituent parts of a charge are kept separate and out of contact with each other, until they reach the zone of fusion, by an intervening cylinder or shell.

Having thus described my invention, what I claim is—

1. The process of smelting sulphides, antimonides, arsenides, or other easily fusible ores, without the necessity for continued use of carbonaceous fuel, which consists in feeding such ores down in a column within a heated furnace, keeping such column out of contact with the furnace walls, as it passes down toward the zone of fusion, by a layer surrounding and in contact with it, which contains granular material, other than carbonaceous fuel, less fusible than the ores in said column, and subjecting the charge to a blast of hot air, substantially as and for the purpose set forth.

2. The process of smelting sulphides, arsenides, antimonides, or other easily fusible ores, without the necessity for the continued use of carbonaceous fuel, which consists in feeding them, in a central column, down within a heated furnace, feeding in around such column so as to form a layer, in contact with the same, entirely surrounding it and keeping it out of contact with the furnace walls, as it descends toward the zone of fusion, silicious or other not easily fusible material, other than carbonaceous fuel, which will remain unfused until it comes to or near the zone of fusion, subjecting the charge to a hot air blast, and continuously drawing the molten products, as formed, down out of the path of the blast, substantially as and for the purpose described.

3. The process of smelting sulphides, arsenides, antimonides, or other easily fusible ores, which consists in feeding them in a central column down within a heated furnace, feeding in around such column, so as to surround it and keep it out of contact with the walls of the furnace, a layer of less fusible material, containing quartzose ores, and limestone mixed with slag, subjecting the charge to the action of a hot blast, and continuously drawing the molten products, as formed, away out of the path of the blast, substantially as and for the purpose described.

In testimony that I claim the foregoing, I have hereunto set my hand, this 3d day of February, 1893.

WILLIAM L. AUSTIN.

Witnesses:
JAS. E. HUTCHINSON,
CHAS. J. WILLIAMSON.